(12) United States Patent
Goop

(10) Patent No.: US 8,033,024 B2
(45) Date of Patent: Oct. 11, 2011

(54) PIPE CUTTER

(75) Inventor: Hans-Joerg Goop, Schellenberg (LI)

(73) Assignee: CEKA Elektrowerkzeuge AG + Co.KG, Wattwill (CH)

( * ) Notice: Subject to any disclaimer, the term of this patent is extended or adjusted under 35 U.S.C. 154(b) by 29 days.

(21) Appl. No.: 11/412,821

(22) Filed: Apr. 28, 2006

(65) Prior Publication Data

US 2006/0260133 A1    Nov. 23, 2006

(30) Foreign Application Priority Data

Apr. 28, 2005 (CH) ........................................ 0749/05

(51) Int. Cl.
*B23D 21/06* (2006.01)
(52) U.S. Cl. ............................................. 30/101; 30/93
(58) Field of Classification Search ................ 30/93–97, 30/101, 102; 7/150, 157; 82/70, 70.2, 72, 82/113, 58; D8/51, 52, 60, 69, 98
See application file for complete search history.

(56) References Cited

U.S. PATENT DOCUMENTS

| | | | |
|---|---|---|---|
| 4,802,278 A * | 2/1989 | Vanderpol et al. | 30/97 |
| 4,813,314 A * | 3/1989 | Kwech | 82/113 |
| 4,939,964 A | 7/1990 | Ricci | |
| 4,953,292 A * | 9/1990 | Tobey | 30/97 |
| D325,504 S * | 4/1992 | Tobey | D8/69 |
| 5,515,609 A * | 5/1996 | Sperti | 30/101 |
| D378,340 S * | 3/1997 | Harter | D8/60 |
| 5,829,142 A * | 11/1998 | Rieser | 30/93 |
| 5,943,778 A * | 8/1999 | Alana | 30/101 |
| 6,095,021 A | 8/2000 | Epperson | |
| 6,202,307 B1 * | 3/2001 | Wrate | 30/101 |
| 6,336,270 B1 * | 1/2002 | Dureiko | 30/102 |
| 6,739,055 B2 * | 5/2004 | Lee | 30/98 |

FOREIGN PATENT DOCUMENTS

| | | |
|---|---|---|
| GB | 1 464 606 A | 2/1977 |
| SU | 1 764 863 A1 | 9/1992 |
| WO | WO 93/13901 A1 | 7/1993 |

* cited by examiner

*Primary Examiner* — Robert Rose
(74) *Attorney, Agent, or Firm* — Rothwell, Figg, Ernst & Manbeck, P.C.

(57) ABSTRACT

A pipe cutter according to the invention has an inner head part which, in the working position, rotates about a pipe which is clamped in the inner head part and is to be processed. Integrated in the inner head part are a spring-mounted cutting wheel head (8) having a cutting wheel (7) for cutting the pipe and a plurality of support rollers (9) in spring-mounted receptacles (10). The arrangement and formation of cutting wheel (7) and support rollers (9) is such that the clamped pipe is at right angles to the cutting wheel (7), and a right-angled cut is thus achieved. Moreover, a defined feed cutting force can be set by the spring mounting of cutting wheel head (8) and support roller receptacles. During cutting, the pressure on the pipe decreases with increasing cutting depth, and the pipe can thus be cut cleanly and without burrs.

24 Claims, 3 Drawing Sheets

PIPE CUTTER

BACKGROUND OF THE INVENTION

1. Field of the Invention

The invention relates to a pipe cutter, and in particular a hand-held pipe cutter.

2. Description of the Background Art

The parting of pipes—also referred to as "cutting into sections", is often the first step in installation work. The quality of the cutting, i.e. in particular the quality of the cutting edge, is of major importance for subsequent operations, in particular for subsequent joining of cut pipe ends. An important criterion for clean parting—e.g. cutting, sawing or punching—of pipes is a right-angled cut; the pipe must therefore be at right angles to the parting tool, such as a cutting wheel. Furthermore, the stable position of the pipe in the tool and the quality of the tool components, such as of the cutting wheel, and of course the parting process itself play a role with regard to the parting quality.

For the cutting of pipes, pipe cutters have been developed for many years. In particular for use on the building site, hand-held tools are desired. Criteria for these tools are the weight, the convenience and compactness, the cost and of course the cutting quality. Moreover, desired tools are those which can be flexibly used and in particular do not occupy too much space during cutting, since it is often also necessary to cut already laid pipes with little space around the pipe. A clean cut when parting pipes is an absolute necessity, since otherwise damage during subsequent use and processing of the pipes is the result. Poor cut edges result, for example, during the joining of pipes by pressing, in pipe ends tilted in the fittings and damaged sealing rings or deformed press fittings and hence leaking systems.

What is generally problematic in the case of known pipe cutters is the ratio of cutting surface quality to length tolerance to costs. Economical tools which are easy to handle often do not give the required cut quality; thus, for example when the pipe is held slightly skew, skew cut edges are the result; moreover, strong contraction of the pipe toward the inside and deformation of the pipe generally occur during cutting. Another disadvantage is the formation of external and/or internal burrs, which have to be removed after the parting and for this reason commercially available tools often have an integrated deburrer. Neglected burrs can cause turbulence in the pipe interiors, which lead to pressure drops and corrosion damage and moreover constitute a risk of injury for the workman.

If the cutting tool is formed in such a way that the pipe has to be rotated for cutting, the safety of the workman may be in danger by deflection of the pipe during processing in the case of unbalanced positioning.

SUMMARY OF THE INVENTION

It is the object of the present invention to provide a pipe cutter having improved cut quality.

This object is achieved, according to the invention, by realizing the defining features described herein.

The invention relates to a pipe cutter for parting pipes, in particular stainless steel and copper pipes. According to the invention, the pipe cutter is formed in such a way that it has a rotatable inner head part having at least one spring-mounted cutting wheel head, in which cutting wheel head a cutting wheel is rotatably mounted—because of the rotatability of the inner head part, the pipe cutter need not be moved around a pipe for cutting a pipe. This formation can be implemented, for example, with an inner head part which is mounted/guided in an outer head part. In particular, the inner head part is composed of at least two inner jaws; likewise, the outer head part/housing head part is advantageously formed from at least two jaws. The housing jaws of the outer head part are formed in such a way that they can receive the inner head, for example with a housing jaw which can be swiveled out. The inner jaws are arranged adjacent to one another in the circumferential direction and are pivotably connected to one another, two jaws not being connected but being capable of being connected or being closed at a closing point. By opening the closing point and swiveling out at least one jaw, a pipe can be received into the pipe receptacle/pipe holder formed by the jaws. In general, the tool or the tool head is opened in order to position a pipe to be processed and is closed.

According to the invention, the tool inner head has at least one spring-mounted cutting wheel head comprising a cutting wheel, the cutting wheel head being spring-mounted in the inner head part and the cutting wheel being mounted so as to be rotatable about the cutting wheel axis in the cutting wheel head. As a result of the spring mounting, it is possible to exert a defined feed force on the pipe. Thus, a defined pretensioning force which decreases with increasing cutting depth and thus permits gentle cutting without drawing-in of the pipe and without burr formation can be set by means of the springs. In addition, the pipe is supported in the pipe holder—formed by the inner jaws—in such a way—either by a plurality of appropriately arranged spring-loaded cutting wheels or by cutting wheel/wheels and support roller/rollers—that a right-angled orientation of the pipe relative to the cutting wheel is achieved and is ensured. In particular, the pipe can be clamped in the tool head and can be encompassed there in such a way that it is automatically oriented at right angles in the head. The parting at right angles to the pipe axis is decisive for the quality of the cut. With the development, according to the invention, of the pipe cutting device parting with a clean cut, straight cut and burr-free edges is achievable. Consequently, time-consuming post-processing of the cut edges is superfluous. Furthermore, contraction of the pipe toward the inside of the pipe is also prevented by the defined delivery of force during parting.

Advantageously, either a plurality of spring-loaded cutting wheels for uniform support and right-angled orientation of the pipe is provided in the inner head part, or one or more cutting wheels and one or more spring-loaded support rollers are provided for bearing. The support rollers are then also mounted in corresponding spring-mounted receptacles. The arrangement of the support roller/rollers and cutting wheel/wheels is then once again such that right-angled cutting of the pipe is achieved. In the case of uniform distribution of the spring force by the cutting wheels or the cutting wheel/wheels and the support roller/rollers about the circumference of the inner head part particularly good—right-angled—support of the clamped pipe is achievable, and in particular the clamped pipe is automatically oriented at right angles. The right-angled orientation of the pipe and the stability of the retention thereof (in the right-angled state) can be further improved by support rollers arranged parallel (left/right) in each case in pairs. Another possibility is to "extend" the rollers in their width—stable support is also achievable by rollers/bearings which are as wide as possible.

In addition, support roller/rollers and cutting wheel/wheels are preferably coated. By coating the support rollers/bearings, firstly the life of the rollers can be increased and secondly it is possible to choose a friction reducing coating (antifriction or nonstick coating), with the result that the force required during cutting can be reduced. Since many tools operate fairly close to the limit in terms of force in the case of large pipe diameters, a reduced applied force for cutting the pipe is a major advantage.

The inner head of the cutting tool is rotatable according to the invention and can be automatically driven, for example by means of a (motor-operated) toothed or worm gear. Thus, for example the inner jaws guided in the outer head part have a drive wheel, such as a toothed wheel/worm wheel/friction wheel, which can be driven by means of a gear—toothed/worm/friction gear—in the tool body connected to the tool head. The drive wheel is coordinated with the inner head part as the first drive unit and the drive is coordinated with the tool body as the second drive unit. First and second drive units constitute a drive device for causing the inner head part to rotate. Tool head—generally composed of outer and inner jaws—and tool body can be coupled via a receptacle. The tool body is formed in particular in a known manner with drive apparatus, handle, lever, actuation button, etc. It is also possible to "mount" the tool head on commercially available device bodies/housings.

For receiving a pipe to be processed, the tool head part can—as already mentioned—be opened, for example by swivelling out an outer and inner jaw. Joint opening of outer and inner jaws is required for receiving the pipe. In a correlation position of outer and inner jaws, the closing points of the jaw are located one on top of the other and can then be opened. This correlation position can be mechanically fixed (for example) by means of marking windows) and/or one (or more) sensors are provided for detecting the correlation position. If the jaws are provided with a magnet at their respective closing point, the closing point position can be detected by a Hall sensor. Moreover, the sensor can indicate, via a device on the pipe cutter, for example acoustically or optically, if the closing points (at the correlation position) are located one on top of the other—for example (in the case of a single cutting wheel) after a revolution of the cutting wheel.

Pipe cutters according to the invention can be formed for different pipe sizes and pipe materials.

If the head part is designed with—mechanically or electrically—radially adjustable cutting wheels/support rollers, different pipe diameters can be processed using one head part. For example, cutting wheel/support rollers are adjustable in the radial direction within a certain range by means of a mechanical device on the tool head part, so that corresponding pipe diameters—such as 35 mm to 54 mm—can be processed. The adjustment can be effected, for example, by providing slides having teeth in the cutting wheel head and/or the respective receptacles of the support rollers, it being possible for a bearing element, such as a pin or bolt, of cutting wheel and/or support rollers or for a plurality of cutting wheels, etc. to be adjusted in height—i.e. radially toward the pipe or away from the pipe. Thus, the bearing element can be appropriately positioned for pipe diameters to be processed, by displacing it and snapping it in in the "toothed slide". Of course, this embodiment can also be realized using other known adjustment techniques.

If the complete tool head can be exchanged (in a known manner), head parts for different pipe sizes, in particular for 35-108 mm pipes, can be produced and can be attached to, mounted on or inserted in respective tool bodies.

Moreover, the head parts can be formed with spring-mounted cutting wheels and optionally support rollers for use for different pipe materials, such as for stainless steel, copper, plastic or composite pipes. In particular, different cutting wheels can be used for the different pipe types, and the coating of the cutting wheel and support rollers can also be appropriately chosen.

The spring mounting according to the invention of cutting wheel head/heads and support roller receptacle/receptacles—and hence the stable and right-angled mounting of a pipe in the tool head and the defined and burr-free cutting process—and the rotation of the inner head part are of course also applicable to cutting tool head parts which are not closed, for example a half-open tool head.

BRIEF DESCRIPTION OF THE DRAWINGS

The pipe cutter according to the invention is described in more detail below, purely by way of example, with reference to specific working examples shown schematically in the drawings, further advantages of the invention also being discussed. Specifically.

The figures are described in relation to one another below.

DETAILED DESCRIPTION OF THE INVENTION

Figure 1:
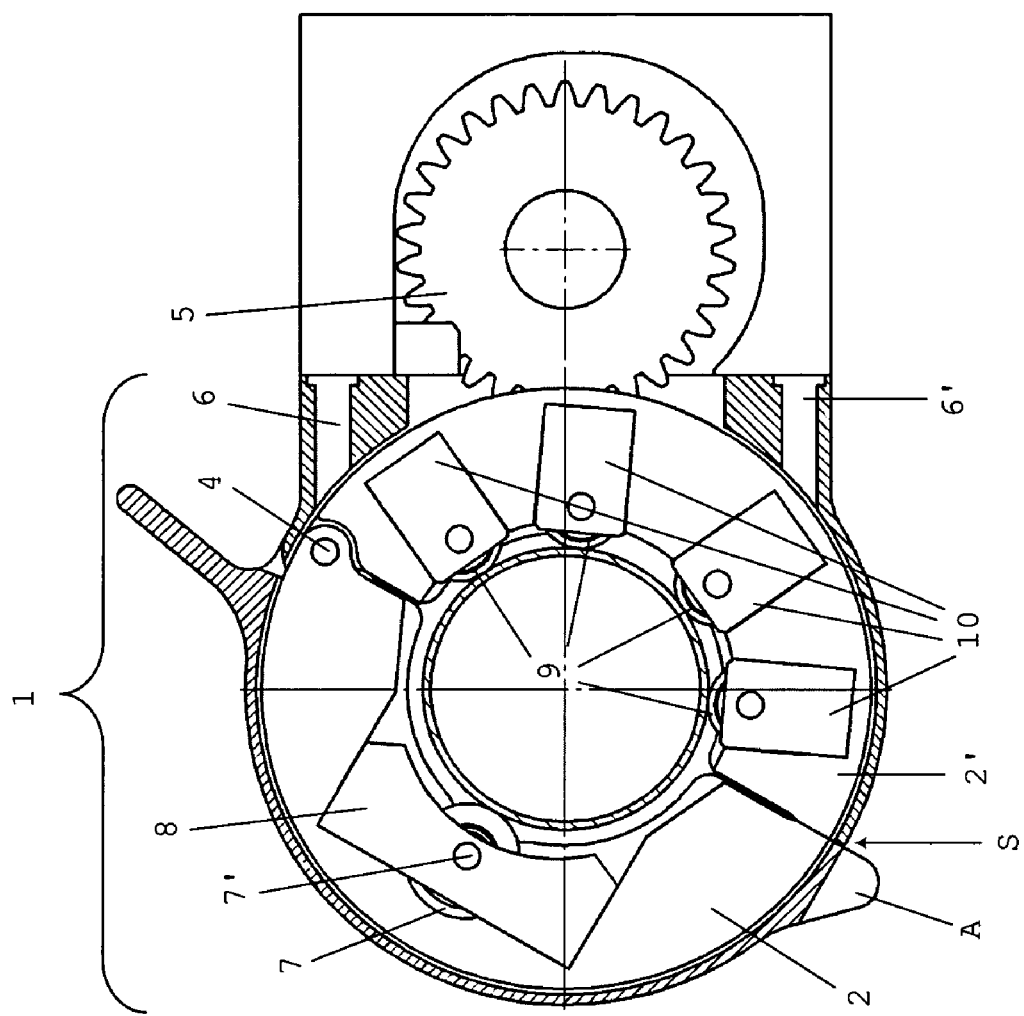
FIG. 1 shows a tool head according to the invention, having a drive, in section

FIG. 1 shows a section through an embodiment of a tool head 1 according to the invention. A first and second inner jaw 2, 2', which are connected to one another via a pivot joint 4, form the basic components of the inner head part here. For larger pipe diameters, a plurality of inner jaws can be provided. The outer head part, which likewise has a first and second housing jaw 3, 3' connected to one another by means of a pivot joint, is recognizable only in rudimentary form. The inner head part is rotatably mounted in a guide in the outer head part and can be driven via a drive device in a direction of rotation in the clockwise or counterclockwise direction.

The drive device is shown only partly in the drawing and, in this working example, comprises a first and second drive ring as a first drive unit and a first and second drive wheel and a motor as a second drive unit. The drive rings are not shown in FIGS. 1 and 2; they are coordinated with the inner head part, for example arranged on the outer circumference on both sides of the inner jaws. FIGS. 3a-3d illustrate a drive ring 15 arranged on the outer circumference on a side of inner jaws 2, 2'. The second drive wheel, here a toothed wheel 5, is shown in the figures. The toothed wheel 5 is no longer part of the tool head 1 but is coordinated with a tool body 1'—shown as a whole in FIG. 2. The tool head 1 can be connected via connecting parts 6, 6' to the tool body 1' (and can be detached therefrom again), for example "can be affixed" thereto. Also housed in the tool body 1' is an electric motor 13 by means of which the toothed wheels are driven. If the motor operates forward and backward a rotatable inner head can be used for cutting a pipe also in an outer head which is not closed in a ratchet-like mode of operation. The inner head is caused to rotate by means of the toothed gear. The apparatus comprising toothed gear with drive in the tool body is sufficiently well known in the prior art and therefore requires no further description. Tool heads which can be removed from the tool body and mounted thereon are known and are commercially available. This enables pipe cutter head parts formed according to the invention to be connected to a large number of commercially available tool bodies, which are generally available as separate, self-contained units.

In this embodiment, the device for driving the inner head is in the form of a toothed gear, but of course other suitable gears, such as a worm or friction gear, can equally be used.

Figure 2:
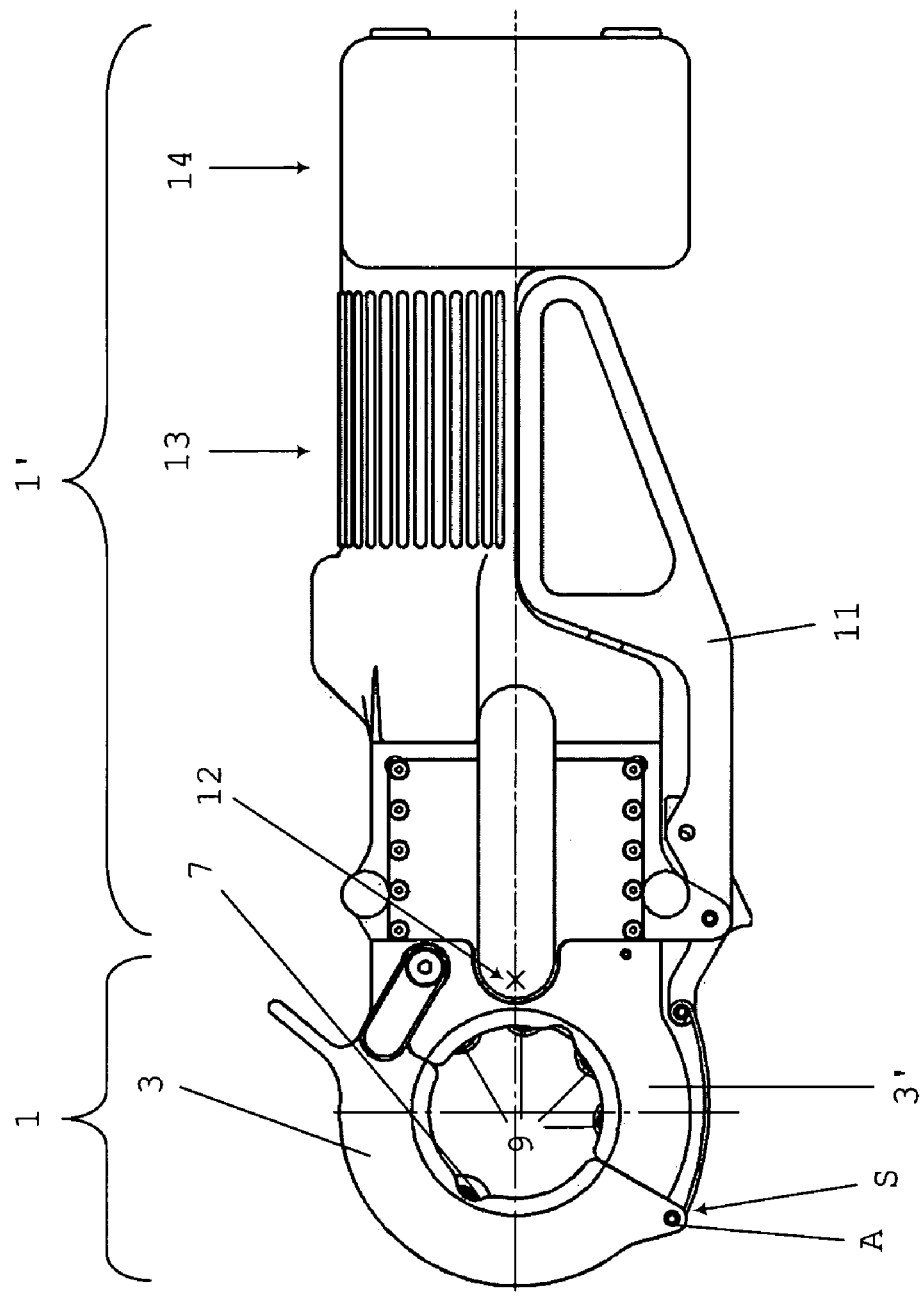
FIG. 2 shows a hand-held pipe cutter in a formation according to the invention, in side view.
Figures 3A, 3B:
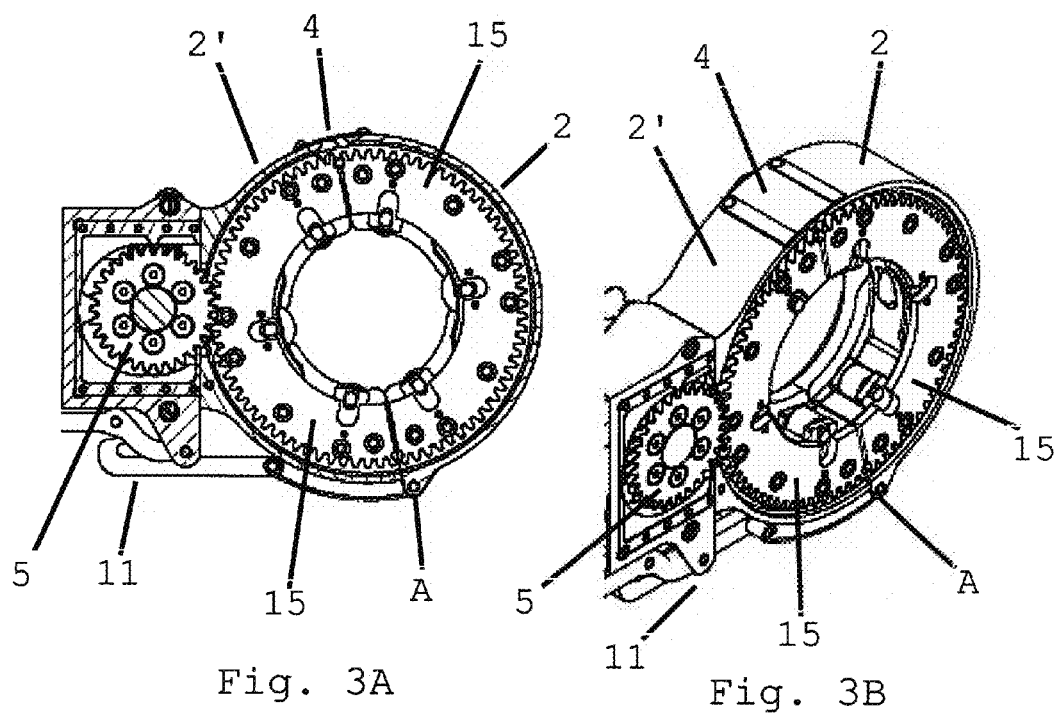
FIGS. 3A-3D show a drive ring arranged on the outer circumference on a side of the inner jaws.
Figures 3C, 3D:
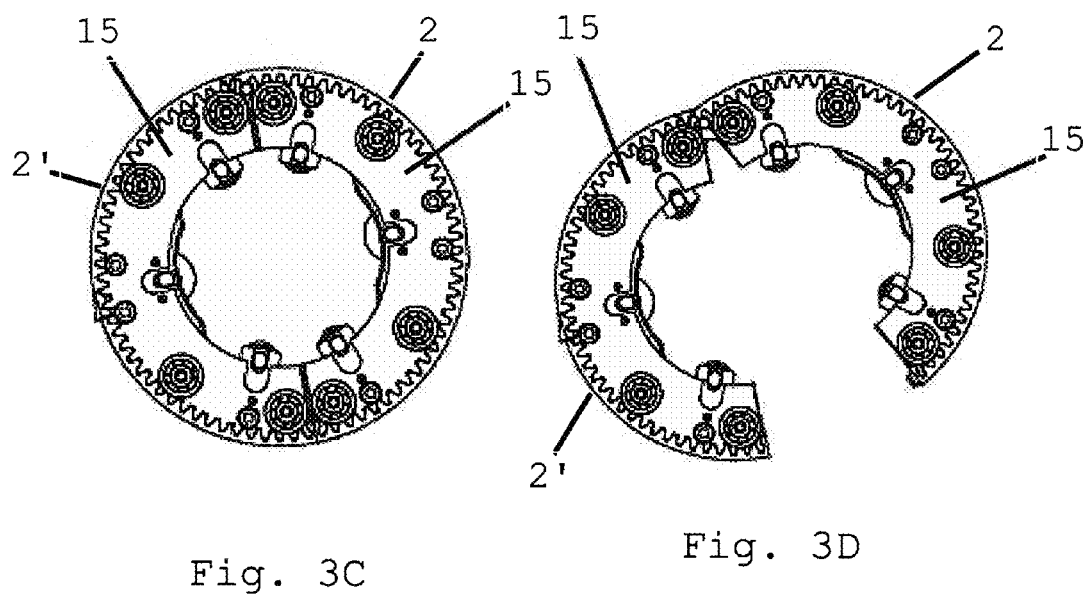

A receiving/closing lever 11 is provided for opening the head. In the embodiment shown, the first housing jaw 3' has a sort of bulge A for attaching such a lever. The receiving/closing lever 11 is shown in FIG. 2.

The first and second inner jaw 2, 2' form a—substantially circular—holder for a pipe to be processed. For receiving the pipe, outer and inner head parts are opened by swivelling out in each case an outer and inner jaw; this is effected with correlation in that the outer and inner jaws are located one on top of the other at their respective closing point. The pipe is inserted into the holder and the jaws are closed. In this operating position, the cutting process can now be started. Thus, the motor is switched on, generally by means of an actuation button, and the inner head part is thereby caused to rotate about the clamped pipe.

A cutting wheel 7 which is arranged so as to be rotatable about the cutting wheel axis 7' in a cutting wheel head 8 integrated in the inner head part—in this case in the first inner jaw 2—is provided for cutting the pipe. In addition, the cutting wheel head 8 with the cutting wheel 7 is spring-mounted—the spring mounting permits the setting of a defined feed force during cutting. Thus, a predetermined pretensioning force can be set by means of the springs. The (maximum) feed force set at the beginning of work by means of the spring tension decreases automatically in the course of the cutting work with increasing cutting depth—due to the relaxation of the springs. Thus, internal burrs due to drawing in toward the interior of the pipe during the cutting process are avoided and a clean cut is achieved.

Because the pipe is clamped at right angles, skew cuts and skew cut edges are furthermore avoided. The right-angled orientation of the clamped pipe is effected by appropriate mounting of the pipe in the inner head part. Right-angled mounting is achieved either by a plurality of cutting wheels arranged around the circumference of the inner head part in spring-mounted cutting wheel heads—with such an embodiment, a full revolution of the inner head about the pipe is not necessary for cutting a pipe—or by additional support rollers in the inner head part. In the embodiment shown, a spring-mounted cutting wheel head 8 with cutting wheel 7 and four support rollers 9 are integrated in the inner head part. Here, the cutting wheel 7 is inserted into the first inner jaw 2, and the four support rollers 9 into the second inner jaw 2'. For the right-angled orientation of a clamped pipe, the arrangement is chosen so that a uniform force acts on said pipe, distributed around the circumference. A pipe which is received into the holder is thus oriented, even so to speak automatically, at right angles (to the cutting wheel 7). The formation with a cutting wheel 7 and four support rollers 9 is purely by way of example, and it is just as possible to provide two cutting wheels and three support rollers, etc. In this working example, the support rollers 9 are in the form of ball bearings and are likewise arranged in appropriate spring-mounted receptacles 10.

FIG. 2 shows a pipe cutter as a hand-held tool comprising tool body 1' and the embodiment of the tool head 1 from FIG. 1. The head part is affixed to the tool body 1'. In this side view of the tool, the outer head part with first and second housing jaws 3, 3' is now recognizable. Also shown here is the above-mentioned receiving and closing lever 11. On actuation of the lever, the outer head part is opened or closed at its closing point S. In the correlation position in which the closing positions of outer and inner head parts are located one on top of the other, the first housing jaw 3 of the outer head part can be swivelled out by means of the lever, and the first inner jaw 2 of the inner head part can then likewise be swivelled out. However, the tool can of course also be formed with an opening and closing mechanism differing from this embodiment.

The tool body 1' furthermore comprises a part of the drive device, here, for example, two drive wheels, an electric motor 13 and a battery 14. Electric motor 13 and battery 14 are arranged in the rear part of the tool body 1' (viewed from the head). The drive wheels are arranged in such a way that they engage the head part when head and body are connected (cf. FIG. 1 with the toothed wheel 5 as the second drive wheel). The formation and arrangement of the wheels is in particular such that head parts for different pipe sizes and pipe materials can be affixed to the body and can be caused to rotate by means of the drive wheels.

One or more sensors can be coordinated with the tool. In FIG. 2, a sensor for indicating the correlation position of the inner and housing jaws is provided. The correlation position sensor 12 is arranged at the point indicated by x. With a Hall sensor as correlation position sensor 12 magnets are detectable in the jaws, here in each case in the second inner and housing jaw 2', 3', which magnets are arranged in such a way that, on detection, the jaws are in the correlation position for opening.

The tool may have further sensors, for example for indicating the lever position (open-closed) or a closed state of the jaws. The measured values of the respective sensors can advantageously be transmitted to the user by means of optical or acoustic signals.

It is furthermore advantageous if the tool is provided with a—mechanical or electrical—device which, on malfunction of the tool, makes it possible to bring the inner jaws into the correlation position of the housing jaws for opening. Such a device can, for example, be in the form of an assembly for manual rotation of the inner jaws, or in the form of a component for attaching a rotating tool.

The invention claimed is:

1. A pipe cutter for cutting a pipe, comprising:
  a head part comprising:
    an outer head part having first and second housing jaws; and
    an inner head part having first and second inner jaws;
    wherein the inner head part is configured to be rotated by a drive device,
    wherein the outer head part is formed as a receptacle for the inner head part,
    wherein the inner jaws are adjacent to one another in the circumferential direction and, in a closed state, form a substantially circular pipe holder,
    wherein a first pivot joint directly connects said inner jaws to one another to enable a pivot movement of the inner jaws relative to one another wherein swivelling at least one inner jaw out enables receiving and removing the pipe and wherein swiveling at least one inner jaw in restores the closed state,
    wherein a second pivot joint directly connects the second housing jaw to the first housing jaw and permits opening and closing of the first and second housing jaws, and
    wherein the inner head part includes a spring-mounted cutting wheel head for movably mounting of a cutting wheel, and said cutting wheel head is configured to allow setting a predetermined pretensioning force.

2. The pipe cutter as claimed in claim 1, further comprising a tool body that is capable of being detachably connected to the head part,
  wherein tool body comprises the drive device, and the drive device comprises a drive unit.

3. The pipe cutter as claimed in claim 2, wherein said drive unit includes
at least one drive wheel for driving the inner head part to rotate and
a drive means for driving the at least one drive wheel.

4. The pipe cutter as claimed in claim 1, wherein the drive device is in the form of a toothed gear or friction gear.

5. The pipe cutter as claimed in claim 2, wherein the tool body is capable of being detachably connected to head parts for different pipe sizes.

6. The pipe cutter as claimed in claim 1, wherein the inner head part has support rollers, to which spring force is applied, for the pipe.

7. The pipe cutter as claimed in claim 6, wherein the support rollers are in the form of bearings.

8. The pipe cutter as claimed in claim 6, wherein the support rollers are formed as at least one of parallel pairs of rollers or so as to have maximum roller width.

9. The pipe cutter as claimed in claim 6, wherein the inner head part has receptacles for the support rollers, which receptacles are spring-mounted in the inner head part, the support rollers being movably mounted in the receptacles.

10. The pipe cutter as claimed in claim 1, wherein at least one of the cutting wheel and the support rollers have a friction-reducing coating.

11. The pipe cutter as claimed in claim 1, wherein at least one of the cutting wheel head and the receptacle is formed in such a way that at least one of the position of the at least one cutting wheel and of the support rollers is radially adjustable in the head part.

12. The pipe cutter as claimed in claim 1, wherein the inner and housing jaws are capable of being opened and closed when the inner and housing jaws are in a correlation position for receiving and removing the pipe.

13. The pipe cutter as claimed in claim 12, further comprising a mechanical or electrical device for establishing the correlation position between inner jaws and housing jaws.

14. The pipe cutter as claimed in claim 12, wherein the pipe cutter has a mechanical device for detecting the correlation position or a sensor, which is a correlation position detector, for detecting the correlation position.

15. The pipe cutter as claimed in claim 12, wherein the inner and housing jaws are in a correlation position when the outer and inner jaws are located one on top of the other at their respective closing point.

16. The pipe cutter of claim 3, wherein said drive means is an electric motor.

17. The pipe cutter of claim 5, wherein said different pipe sizes have pipe diameters between 35 mm and 108 mm.

18. The pipe cutter of claim 7, wherein said bearings are ball bearings.

19. The pipe cutter as claimed in claim 13, wherein the pipe cutter has a mechanical device for detecting the correlation position or a sensor, which is a correlation position detector, for detecting the correlation position.

20. The pipe cutter of claim 14, wherein said sensor is a Hall sensor.

21. The pipe cutter of claim 19, wherein said sensor is a Hall sensor.

22. The pipe cutter of claim 14, wherein said sensor triggers at least one of an acoustic or optical signal on detection of the correlation position.

23. The pipe cutter of claim 19, wherein said sensor triggers at least one of an acoustic or optical signal on detection of the correlation position.

24. The pipe cutter of claim 1, wherein the first and second pivot joints are not located adjacent to the drive device.

* * * * *

UNITED STATES PATENT AND TRADEMARK OFFICE
CERTIFICATE OF CORRECTION

PATENT NO. : 8,033,024 B2
APPLICATION NO. : 11/412821
DATED : October 11, 2011
INVENTOR(S) : Hans-Joerg Goop Page 1 of 1

It is certified that error appears in the above-identified patent and that said Letters Patent is hereby corrected as shown below:

In the Claims

Col. 7, line 10, Claim 5: "pipe sizes." should be --pipe sizes in a modular manner.--

Signed and Sealed this
Second Day of July, 2013

Teresa Stanek Rea
*Acting Director of the United States Patent and Trademark Office*